(12) United States Patent
Northcutt

(10) Patent No.: US 6,848,244 B2
(45) Date of Patent: Feb. 1, 2005

(54) ROTATING CUTTER HEAD

(76) Inventor: Terry Northcutt, 29925 Hwy. 108, Cold Springs, CA (US) 95335

(*) Notice: Subject to any disclaimer, the term of this patent is extended or adjusted under 35 U.S.C. 154(b) by 0 days.

(21) Appl. No.: 10/234,409

(22) Filed: Sep. 3, 2002

(65) Prior Publication Data
US 2003/0093984 A1 May 22, 2003

Related U.S. Application Data
(60) Provisional application No. 60/316,581, filed on Aug. 31, 2001.

(51) Int. Cl.[7] .............................................. A01D 50/02
(52) U.S. Cl. .................................................... 56/249.5
(58) Field of Search ...................... 56/294, 15.1, 15.2, 56/500, 503, 504, 231, 249, 249.5, 289, 314, DIG. 12, DIG. 13; 420/121, 122; 172/45, 122

(56) References Cited

U.S. PATENT DOCUMENTS

| | | |
|---|---|---|
| 3,727,848 A | 4/1973 | Francis |
| 3,944,147 A | 3/1976 | Pletcher |
| 4,031,695 A | 6/1977 | Diggs |
| 4,193,556 A | 3/1980 | Linnerz |
| 4,202,078 A | 5/1980 | Malinak |
| 4,355,670 A | 10/1982 | Ohrberg et al. |
| 4,369,548 A | 1/1983 | Malinak |
| 4,407,458 A | 10/1983 | Hotimsky |
| 4,519,551 A | 5/1985 | Ceurvorst |
| 4,631,910 A * | 12/1986 | Doyen et al. .................. 56/505 |
| 5,188,303 A | 2/1993 | Hoof |
| 5,314,126 A | 5/1994 | Alvarez |
| 5,419,380 A | 5/1995 | Bot |
| 5,485,718 A * | 1/1996 | Dallman ....................... 56/294 |
| 5,499,771 A | 3/1996 | Esposito et al. |
| 5,509,488 A | 4/1996 | Mariläinen |
| 5,513,485 A | 5/1996 | Hashimoto et al. |
| 5,555,652 A | 9/1996 | Ashby |
| 5,570,571 A * | 11/1996 | Dallman ..................... 56/249.5 |
| 5,641,129 A | 6/1997 | Esposito et al. |
| 5,692,689 A | 12/1997 | Shinn |
| 5,743,315 A | 4/1998 | Esposito et al. |
| 5,794,866 A | 8/1998 | Shinn |
| 5,826,339 A | 10/1998 | Price |
| 5,829,692 A | 11/1998 | Walters |
| 5,975,167 A | 11/1999 | Brown |
| 6,000,205 A | 12/1999 | Joray |
| 6,042,035 A | 3/2000 | Grobler et al. |
| 6,138,444 A | 10/2000 | Torras, Sr. |
| 6,257,511 B1 | 7/2001 | Turner |
| 6,338,013 B1 | 1/2002 | Ruffner |
| 6,393,959 B1 | 5/2002 | Amemiya |
| 6,405,769 B1 | 6/2002 | Labrie |
| 6,412,530 B1 | 7/2002 | Mangold |

* cited by examiner

Primary Examiner—Robert E Pezzuto
(74) Attorney, Agent, or Firm—Morrison & Foerster LLP

(57) ABSTRACT

This is a large rotatable cutter head primarily useful in masticating vegetation ranging from grasses to large trees. The inventive cutter head is typically mounted on an articulating arm on a tractor or tread-based vehicle. Depending upon the size of the arm and its maneuverability, the cutter head may be used to cut and grind vegetation variously from the ground surface to many feet off the ground. The rotatable cutter head assembly includes a number of rotating cutters mounted inside the periphery of the assembled drum and that spin freely outside the diameter of that drum and, upon contact with vegetation, rotate into the drum assembly. The invention includes combinations of the cutter head with the support vehicle or articulating arm and methods of using the cutter head.

10 Claims, 4 Drawing Sheets

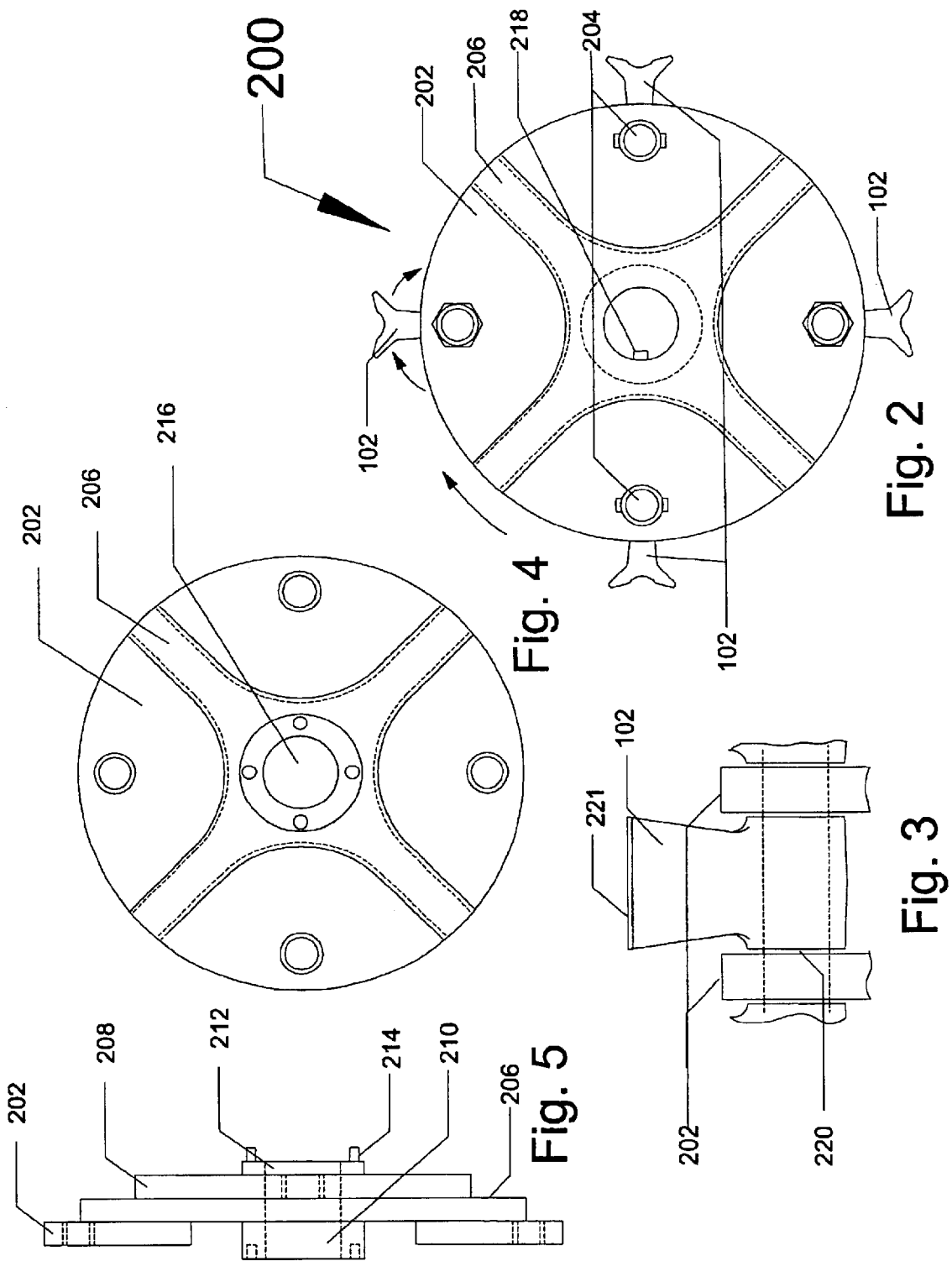

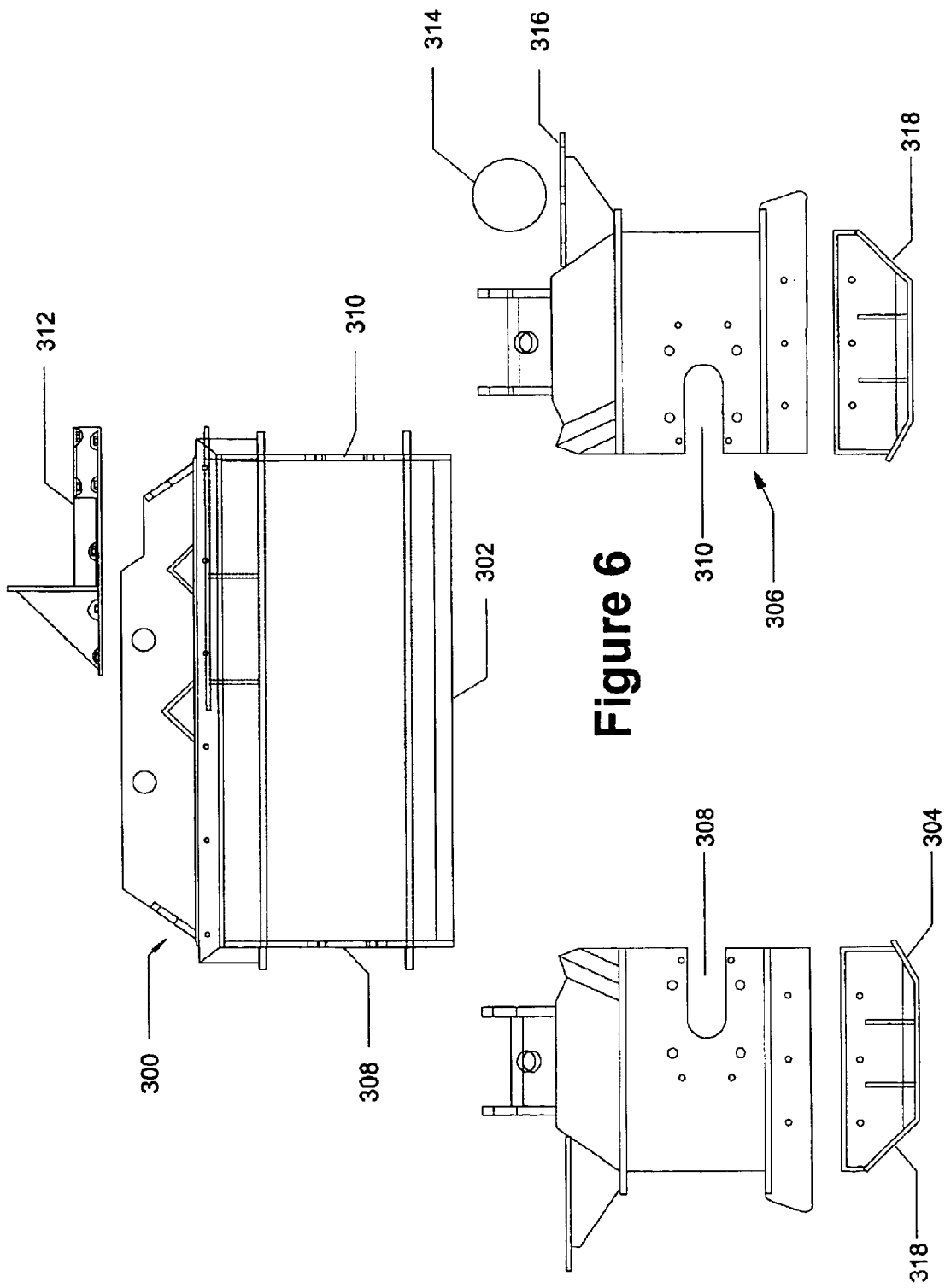

ROTATING CUTTER HEAD

FIELD OF THE INVENTION

This invention relates to a large rotatable cutter head primarily useful in masticating, grinding, and mulching vegetation ranging from grasses to large trees. The inventive cutter head is typically mounted on an articulating arm on a tractor or tread-based vehicle. Depending upon the size of the arm and its maneuverability, the cutter head may be used to cut and grind vegetation located variously from the ground surface to many feet off the ground. The rotatable cutter head assembly includes a number of rotating cutters mounted inside the periphery of the assembled drum. The rotating cutters spin freely; their swing forms a circle extending from outside the diameter of the drum assembly (where they contact the vegetation) and into the drum assembly. The invention includes combinations of the cutter head with the support vehicle or articulating arm and methods of using the cutter head.

DESCRIPTION OF THE DRAWINGS

FIG. 2 shows a side view of individual section of cutter head assembly and the attendant cutters.

FIG. 3 is a side view, close-up of an individual cutter or cutter knife.

FIG. 4 is a side view of an individual disk subassembly section without cutter blades.

FIG. 5 is an edge view of the FIG. 4 subassembly.

FIG. 6 shows various views of a housing suitable for the cutter head assembly.

DESCRIPTION OF THE INVENTION

In general, this invention deals with a rotating cutter assembly and its surrounding support components. It is most useful when mounted on a self-propelled, high ground clearance machine. The supporting machinery is likely, most often a diesel powered, tracked vehicle having hydraulically driven accessories. Such machinery is sold commercially by, amongst others, the Caterpillar Company for use as excavators. A vehicle typical of this type is shown in the Figures. The rotating cutter assembly will typically be mounted at the end of the articulated arm allowing ease of use at levels variously from the surface of the ground to the end of the extended articulated arm. In concept, my design is a more-flexible design intended to replace older designs that were susceptible to frequent breakage. The repair and rebalancing of the older designs was often time-consuming and since, such repair takes place in the field, fairly expensive. My design has easily replaceable cutters.

Figure 1:
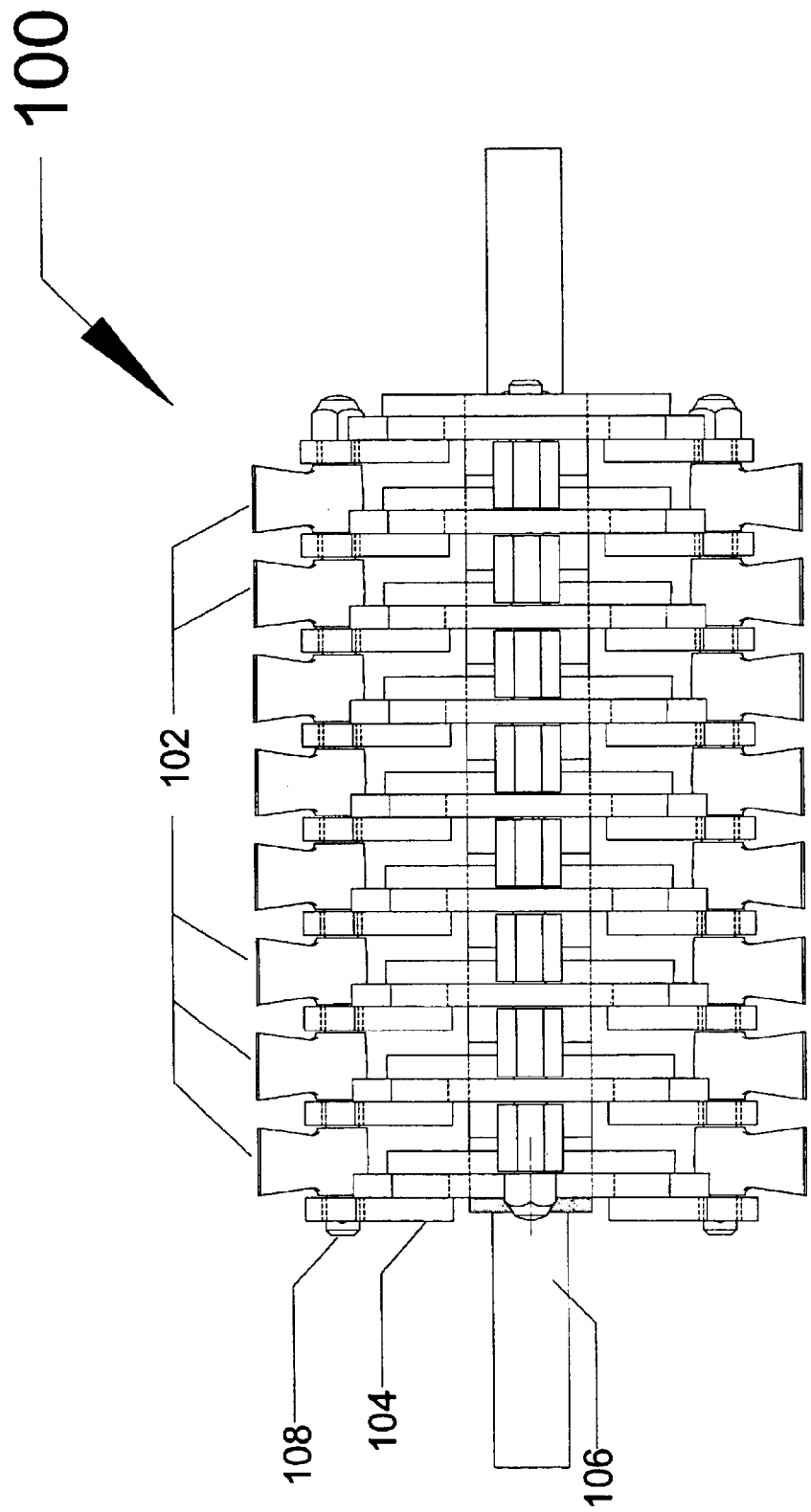
FIG. 1 shows a side view of the inventive cutter head assembly.

The inventive cutter head assembly 100 shown in FIG. 1. It is shown there without drive gear or drive motors although, in use, such may be desirable. In any case, the cutter head assembly 100 may be made up of three major conceptual parts. The first major component group—all of these will be discussed in more detail below—are the cutters or cutter knives themselves 102. The second major component, to which the cutters are attached, is the cutter drum 104. The third major section is the drive shaft 106.

In operation, the drive shaft 106 is fixedly attached to the drum assembly 104. A motor of some type, e.g., electric, hydraulic, internal combustion, etc, is used to turn the drive shaft 106, indirectly or directly, and to drive rotating cutter drum 104. The drive motor may be located remotely from the drive vehicle and desirably is placed on the end of the articulating arm near the cutter head assembly. A suitable placement of the drive motor is shown below.

Cutters 102 are free to rotate about cutter axles 108. Centrifugal force swings the cutter heads 102 out from the peripheral confines of cutter drum 104. The cutters 102 are placed within the drum assembly 104 in such a way that they are desirably able to rotate 360° freely about the cutter axle cutter shaft 108. The diameter of the assembly 100, from tip to tip of cutters 102, might typically be in the range of two to three feet. Typical rotational speeds for the assembly 100 would be from 800 to 2,000 rpm, preferably 1,000 to 1,500 rpm. Although sizes, speeds, rates, etc. are provided throughout the specification, they are only given as examples of useful data and are not intended to limit the claims in any way.

A typical drive shaft 106 might be four inches, more or less as the specific design dictates, in diameter. The design shown in FIG. 1 typically would be made from steel plate from 1 to 2 inches in thickness. The cutters or knives 102 might be sized to be three to five inches in width, preferably about four inches in width.

Rotating drum assembly 104 in FIG. 1 may be made up of a series of disk subassemblies such as are shown in FIGS. 2, 4, and 5. Subassembly 200 (as shown in FIG. 2 with rotatable knives 102 attached) may be made up in sheet steel sections, perhaps welded together, although other designs are similarly appropriate. For instance, the subassembly may be cast or forged. The cutter drum subassembly 200, as shown in FIG. 2, may be made up of a full disk 202 into which the rotatable blades 102 are mounted via a knife axle shaft 204. A cutout disk 206 may be used variously for providing a flywheel effect, a measure of additional cutting action, and additional stiffness. A spacer 208 is also shown. As may be seen in FIG. 5, a pair of hubs 210 and 212 may be used to join a specific subassembly 200 to an adjoining subassembly 200 in a rotating assembly using, e.g., dowels 214 or the like. The drive shaft 106 as shown in FIG. 1 passes through opening 216 and may be driven by a key 218 as shown in FIG. 2. Preferably each disk subassembly 200 is individually driven from drive shaft 106.

FIG. 3 shows an individual cutter knife 102 as it would be mounted between two rotating disks 202. Generally, although not necessarily, a number of cutter knives 102 are mounted on a single axle shaft 220. The knife axle shaft 220 preferably passes from one end of the rotating cutter assembly 100 as shown in FIG. 1 to the other and allows ease of cutter 102 replacement by the removal of the shaft 220 from one end of the assembly or the other. It is desirable to include bushings or bearings about each of the axles and within the rotating bore of cutter head 102. The cutter knife or blade 102 is shown to be a weighted towards the outer end and having sharpened edges 221 at those ends. The approximate "Y" shape to the cutter knife 102 allows the sharp ends to approach the target vegetation with a sharp edge and increases the efficiency of the cutter assembly. These cutter heads 102 are more than mere flails in that they are able to rotate through 360° in traveling through the cutter assembly and, in the depicted variation, rotate only in a single axis about their respective axles. From a design standpoint, the cutter blades 102 are desirably formed of a single piece of metal or at least an assembled, integrated piece of metal when, e.g., a tougher leading edge is introduced onto the leading edge of the blades by, e.g., welding.
"

As may be apparent from the nature of the operation of this device, it is desirable to install it in a partial housing adapted to protect an operator from debris created during the operation of the device, from rocks that may be picked up during low level use, and, perhaps, from portions of blades broken during use. This design of the cuter head assembly allows the individual cutters to rotate at a speed higher than the drum peripheral speed and so to improve the efficiency of the cutters in macerating vegetation.

FIG. 6 shows a suitable enclosure 300 in front view 302, in left side view 304 (the "bearing end" view), and in right side view 306 (the "drive end" view). The cutter assembly fits within the housing, and the cutter assembly axle extends between and extends through cutouts 308, 310 in the housing side walls. Bearing retainers (not shown for clarity sake) would be attached to the side walls at cutouts 308, 310 to support the cutter assembly axle. The drive motor, e.g., a hydraulic motor, would be situated on the motor mount 312 (shown exploded from the housing 300) and located behind guard 314 as seen in right side view 306. The drive motor and the motor mount 312 would be mounted at site 316. The drive motor typically would drive the cutter head via one or more belts. Other drive mechanisms would be acceptable, e.g., gear drives in rubber-unfriendly habitats. A skid component is shown in the FIG. 5 drawings.

Figure 7:
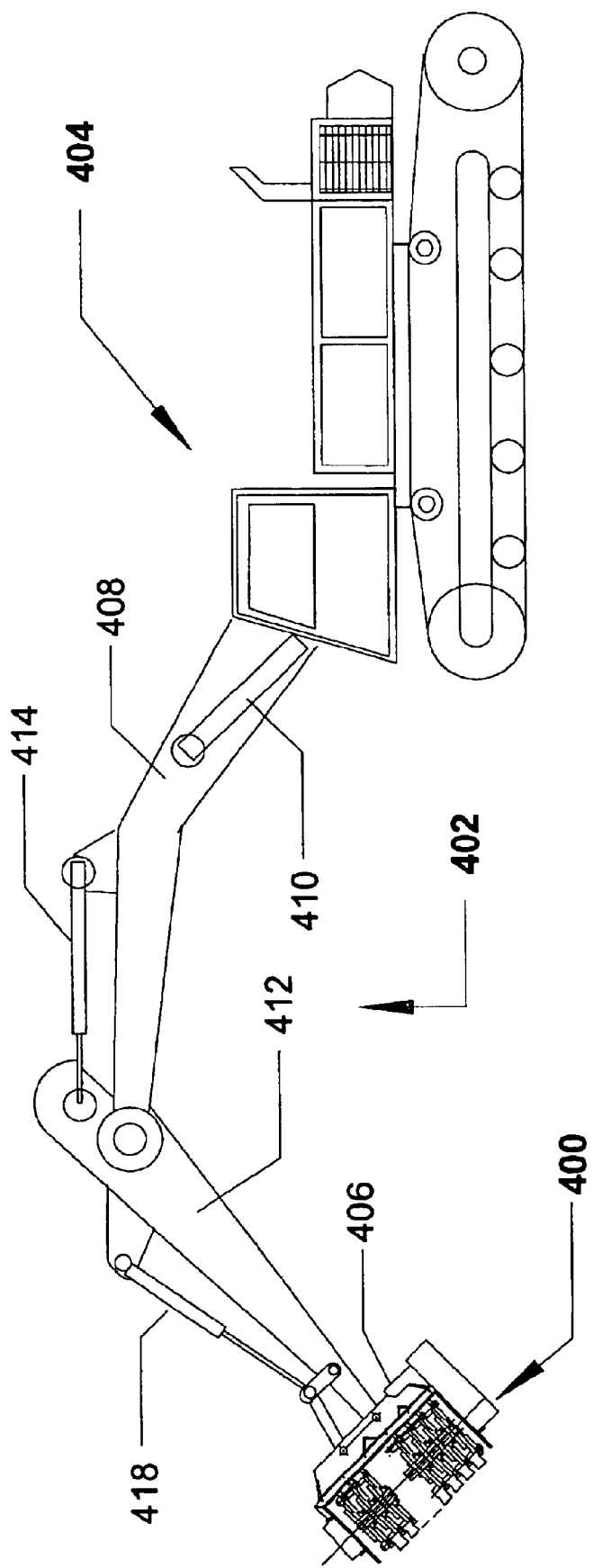
FIG. 7 shows the housing and cutter head assembly mounted on the articulated arm of a tracked vehicle.

FIG. 7 shows the cutter assembly 400 mounted at the end of an articulating arm assembly 402 that, in turn, is a portion of an excavator or back-hoe 404 such as might be made by the Caterpillar Company. Supporting the inventive rotating cutter assembly 400 and the hydraulic motor 406 is the arm generally controlling the height of the assembly's reach by its hydraulic cylinder 410. Similarly, some measure of reach and placement is had via control of arm 412 by hydraulic cylinder 414. Orientation of the cutter assembly is had via hydraulic control cylinder 418. Although not shown on this depiction, the distal tip of the arm assembly 402 may be adapted to allow rotation of the cutter assembly 400 about the axis of arm 412. The controls mentioned herein are those normally associated with such an excavation device. In any case, the various controls are for the purpose of moving the rotating cutter against various target vegetation.

The inventive rotating cutter assembly is used in the following fashion: the head is rotated at a speed sufficient to move the cutter blades out of the diameter of the support drum assembly. This allows the blades to contact the vegetation. As a blade hits the vegetation, it both cuts vegetation and rotates into the drum. As the drum then turns, the cutter blade or knife is free to rotate back out of the periphery of the drum into a position for further cutting. When used with a tracked vehicle or other vehicle such as shown in FIG. 7, the cutter assembly is placed in position to contact vegetation by appropriate movement of the articulated arm.

This invention has been described by use of examples and although various sizes and dimensions and speeds are mention in the text above the invention is obviously not so limited.

I claim:

1. A rotatable cutter assembly for cutting vegetation comprising:
    (a) a rotatable drum assembly i.) having a periphery and ii.) supporting, a interior to the periphery, a multiplicity of freely rotatable cutter knives and iii.) adapted to allow the rotatable cutter knives to rotate from within the periphery and to extend both within the periphery and beyond that periphery, and
    (b) said multiplicity of freely rotatable cutter knives.

2. The rotatable cutter assembly of claim 1 further comprising a drive shaft adapted to rotate said rotatable drum assembly.

3. The rotatable cutter assembly of claim 1 further comprising a drive motor configured to rotate the rotatable drum assembly.

4. The rotatable cutter assembly of claim 3 wherein the drive motor is a hydraulic motor.

5. The rotatable cutter assembly of claim 1 further comprising an articulated arm supporting said rotatable drum assembly and configured to controllable move the rotatable drum assembly in various directions against vegetation.

6. The rotatable assembly of claim 5 further comprising a vehicle suitable for movement over terrain.

7. The rotatable cutter assembly of claim 1 wherein the freely rotating cutter knives are adapted to rotate at least 360°.

8. The rotatable cutter assembly of claim 1 wherein the freely rotating cutter knives are each single piece.

9. The rotatable cutter assembly of claim 1 wherein the freely rotating cutter knives are each "Y" shaped.

10. The rotatable cutter assembly of claim 1 further comprising a housing covering at least a portion of the rotatable drum assembly.

* * * * *